Dec. 29, 1942.   J. C. MEISLER   2,306,638
FISHING ROD
Filed Nov. 6, 1941
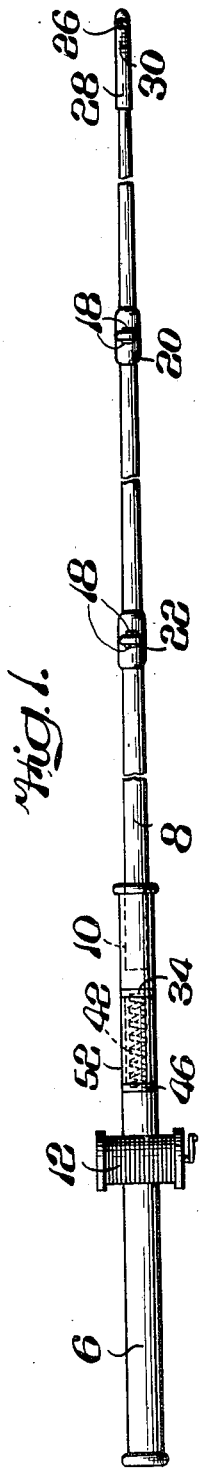
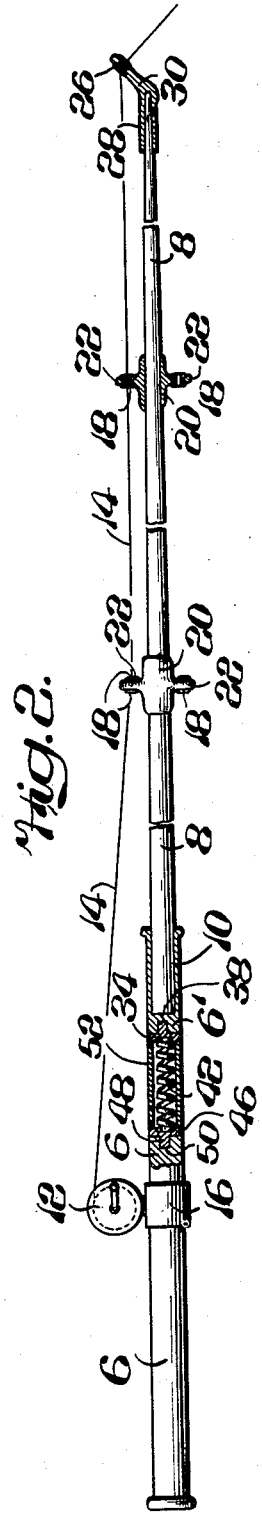
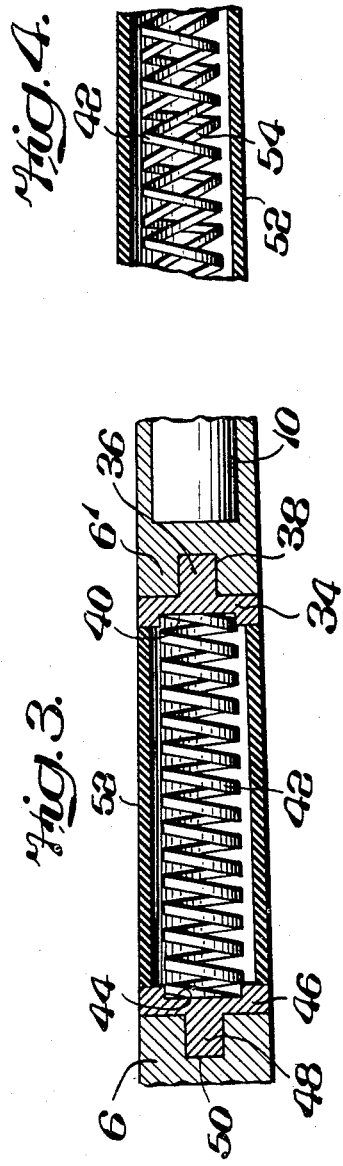
INVENTOR
JOHN C. MEISLER
BY
*Louis Necho*
ATTORNEY Patented Dec. 29, 1942

2,306,638

UNITED STATES PATENT OFFICE 2,306,638

FISHING ROD

John C. Meisler, Philadelphia, Pa.

Application November 6, 1941, Serial No. 417,971

2 Claims. (Cl. 43—18)

Fishing rods, and especially those made for surf fishing where it is necessary to throw the line out as far as possible, are usually made rather long so as to give the necessary leverage in the throwing out of the line, and for convenience they are made in two sections, one known as the "tip" which in reality is the major portion or body of the rod, and the other the handle or "butt" which is shorter, thicker and more rigid and which supports the fishing reel and which also has a socket at its forward end in which the thick end of the body or tip of the rod is adapted to seat. Flexibility is very desirable in fishing rods and for that purpose they are made of flexible bamboo strips suitably assembled and tapering so as to produce a maximum whip action. The butt or handle of conventional fishing rods, however, has heretofore been made quite rigid so that its distal end, into which the body of the rod is fitted, constitutes a fixed or rigid point limiting the flexibility of the rod.

It is therefore the object of my invention to produce a novel construction in a fishing rod by means of which the flexibility is increased without sacrificing the necessary rigidity at the points where such rigidity is essential, and more specifically my invention relates to the provision of a flexible connection intermediate the junction of the butt with the body of the rod and the point at which the fishing reel is mounted and the balance of the butt or handle which is grasped by the fisherman either during casting or reeling in.

Other novel features of advantage and construction will be more clearly understood from the following specification and the accompanying drawing in which:

Fig. 1 represents a plan view of a fishing rod embodying my invention.

Fig. 2 represents a view, partly in section and partly in side elevation, of the same.

Fig. 3 represents, on a greatly enlarged scale, a fragmentary section showing details of construction.

Fig. 4 represents, on an enlarged scale, a view partly in section and partly in elevation showing a modified form of construction.

Referring to the drawing in which like reference characters indicate like parts, I have shown in Fig. 1 a conventional fishing rod comprising the butt or handle 6 and what is known as the "tip" or body of the rod 8. The butt 6 is conventionally provided with a socket 10 into which the end of the body 8 is inserted as shown in dotted lines in Fig. 1. 12 designates a conventional reel which carries the line 14 and which is suitably secured to the butt by any desired clamp 16. In lieu of the metal frames carrying the agates or glass rings 18 I utilize a rubber sleeve 20 of the desirable resiliency which is provided with a tapered bore so that it may be slipped over the thin tapered end of the body 8 as far back towards the butt as it will go which will automatically position it at a predetermined point. As illustrated in Fig. 2 no regard has been given to dimensions, the purpose being merely to illustrate the construction as clearly as possible. The sleeve 20 is provided with oppositely disposed ears 22 in which are premolded the guide rings 18 which may be of glass, agate, or any other wear-resisting material which is capable of high polish, it being understood that if desired only one of the ears 22 on one side can be used, but it is conventional to have oppositely disposed guide rings so that one may be used for some time and, if the rod shows a tendency to bend in that direction, the other ring can be used to counteract that tendency. As will be seen from Fig. 1, any desired number of sleeves 22, such as that shown in Fig. 2, can be used according to the length of the rod and the purpose to which it is to be put. Likewise, at the thin end or extremity of the body 8 of the rod, instead of utilizing a metal sleeve having a frame for supporting the extreme guide ring 26 I utilize another sleeve 28 also made of material having the desired resiliency and having a tapered bore which fits over the tapered end of the rod as clearly shown in Fig. 4. The tapered sleeve 28 is provided with an extension 30 disposed at a suitable angle with respect to the axis of the rod and in the extension 30 is embedded the guide ring 26 through which the line 14 passes.

As will be best seen from Figs. 2 and 3 the butt or handle 6, instead of being made of one piece as is the conventional practice, is according to my invention made of two pieces 6 and 6', the latter containing the socket 10 into which the thick end of the fishing rod 8 is inserted in the usual manner. The portions 6 and 6' of the butt are interconnected in a novel way which imparts a certain flexibility near the junction of the butt with the body of the rod proper and this construction is best understood from the enlargement of Fig. 3. Thus it will be seen that an anchor plate 34 is provided which has the same external diameter as the portion 6' so that the exteriors of the anchor plate 34 and the butt portion 6' are flush. The anchor plate 34 may be connected in any suitable way to the butt portion 6' but, as shown in Fig. 3, it is provided with a dowel 36 which is wedged in a corresponding seat 38. The engagement between the dowel 36 and its seat 38 is frictional or can be supplemented by adhesive. The anchor plate 34 is recessed as at 40 to receive one end of the spring 42, the end of the spring 42 being preferably welded or otherwise securely fastened in the recess 40. The other end of the spring 42 is likewise welded or otherwise rigidly secured to a recess 44 in the anchor plate 46, the anchor plate 46 being secured by means of the dowel 48 engaging the seat 50 in the juxtaposed end of the butt 6. 52 designates a flexible sleeve preferably of a rubber composition or the like the exterior of which is flush with the exteriors of the butt portions 6 and 6' and which encloses the spring 42. The sleeve 52 is suitably secured to the juxtaposed faces of the anchor plates 34 and 46 in any desired manner such as by being molded onto said anchor plates. In most cases a single spring such as that shown in Fig. 3 having the proper tension will be sufficient, but in certain other cases it may be preferable to use the double spring construction shown in Fig. 4 in which a right hand spring and a left hand spring are combined to afford not only additional but also balanced resilient connection or support. As shown in Fig. 4 I combine with the action of the spring 42 of Fig. 3 an oppositely coiled spring 54. It is to be understood that in the construction illustrated in Fig. 4 the anchor plates 34 and 46 and the protecting and covering sleeve 52 and indeed the entire construction is the same except for the addition of the spring 54.

Having thus described my invention, what I claim as new and desire to secure by Letters Patent is:

1. A fishing rod comprising a handle and an elongated body, said handle comprising a rear grip portion and a front socket portion, said front portion being adapted to receive and engage a juxtaposed end of said body, a spring interconnecting the juxtaposed ends of said rear and front portions, and a flexible sleeve enclosing said spring.

2. A fishing rod comprising a handle and an elongated body, said handle comprising a rear grip portion and a front socket portion, said front portion being adapted to receive and engage a juxtaposed end of said body, and a pair of oppositely wound springs interconnecting the juxtaposed ends of said rear and front portions.

JOHN C. MEISLER.